United States Patent Office 2,762,778
Patented Sept. 11, 1956

2,762,778
METHOD OF MAKING MAGNETICALLY-ANISOTROPIC PERMANENT MAGNETS

Evert Willem Gorter, Gerhart Wolfgang Rathenau, and Andreas Leopoldus Stuyts, Eindhoven, Netherlands, assignors to Hartford National Bank and Trust Company, Hartford, Conn., as trustee No Drawing. Application December 10, 1952, Serial No. 325,202

Claims priority, application Netherlands December 21, 1951

15 Claims. (Cl. 252—62.5)

This invention relates to magnetically-anisotropic permanent magnets and to methods of making the same.

The invention is particularly concerned with permanent magnets made of materials of the type described in the copending United States patent application Serial No. 239,264, filed July 30, 1951. That application discloses a new class of permanent magnet materials composed principally of a composite oxide of iron and at least one of the metals selected from the group consisting of barium, strontium and lead. Such materials may be characterised by a hexagonal, for example, magnetoplumbite, crystal structure and have the composition $MO.6Fe_2O_3$ in which M is at least one of the metals of the above-mentioned group. Calcium may replace one of the metals in the crystals in an amount not exceeding 0.4 as an atomic fraction. In making such materials the starting materials are ferric oxide ($Fe_2O_3$) and one or more oxides of strontium, barium and lead, with the possible partial replacement of at least one of the latter oxides with calcium oxide. These starting materials are mixed and heated to a temperature of about 900° C. to 1450° C., preferably between 1100° C. and 1450° C., for sufficient time to form non-cubic crystals consisting of material of the composition given above.

Such permanent magnets have numerous advantages, for example, the starting materials are readily available and inexpensive, the magnets can be manufactured in an inexpensive manner and the magnets have good magnetic properties, for instance, a field strength of dissappearance, $I^HC$ of at least 700 Oersteds and a remanence $B_r$ of at least 1200 Gauss. However, the $(BH)_{max}$ value of such magnets is not greater than about $1.1 \times 10^6$ Gauss-Oersted per cubic centimeter which is below that of many of the known magnet steels.

The main object of the present invention is to materially improve the magnetic properties, particularly the $(BH)_{max}$ value, of permanent magnets of such materials.

A further object of the invention is to increase the $(BH)_{max}$ value of such permanent magnets up to $1.75 \times 10^6$ and more.

A still further object is to produce a magnetically-anisotropic permanent magnet of excellent magnetic properties while using inexpensive and readily-available materials.

A further object of the invention is to provide inexpensive and simple methods of producing magnetically-anisotropic permanent magnets.

The permanent magnets according to the invention comprise ferromagnetic material of non-cubic crystals, preferably of hexagonal structure, of a composite oxide of iron and at least one of the metals selected from the group consisting of Ba, Sr and Pb; the body being magnetically-anisotropic in a principal direction and having in said direction a $(BH)_{max}$ value which is more than 1.1, preferably more than 1.75, and which is between about 140% and 200% of anisotropic magnet of the same composition. The magnets are preferably sintered and an atomic fraction of not more than 0.4 of one or more of the metals Ba, Sr and Pb may be replaced in the crystals by calcium. In such magnets the ferromagnetic properties are determined substantially by single and/or mixed crystals having the structure of magnetoplumbite of the composition $MO.6Fe_2O_3$ in which M indicates one or more of the metals Ba, Sr and Pb, with the possible partial replacement by Ca.

In accordance with the method of the present invention we produce the magnetic anisotropy by magnetically orienting the crystals, by mechanically orienting the crystals by altering the shape of the crystals mechanically, for instance, by pressure, centrifugal force or by rolling action at high temperatures or by combined mechanical and magnetic actions, while the crystals are arranged in a mobile condition, i. e. one which permits the necessary movement.

In one embodiment of the method of the invention we employ material of the type described above, which is in a finely-divided state, for example, particles less than $10\mu$ and preferably less than $5\mu$ and place the same in a sufficiently mobile condition so that the particles can be oriented by a magnetic field. The orientation is obtained by applying a magnetic field exceeding 100 Oersteds, preferably about 700 Oersteds. The oriented material is then compressed into a compacted body, preferably while the magnetic field is still being applied. Instead of compressing the oriented particles, it is possible to sinter the same by heating to a temperature of about 900° C. to 1500° C., if desired, while maintaining the magnetic field.

In another embodiment of the method, the fine particles are put in a mobile condition by replacing them loosely in a container which is vibrated while a magnetic field is applied to orient the particles. After the orientation the particles may be compressed or sintered into an adherent body with or without the presence of the magnetic field.

The ferromagnetic material may be reduced to the required small particle size by mechanical means and many of the particles will be in the form of single crystals. As a result, the particles will have decided preferential directions of magnetization which are parallel to a crystallographic main axis and which, in the case of hexagonal crystals, are parallel to the hexagonal crystal axes. As the particles will have some freedom of movement when in a mobile condition, they will, under the influence of the magnetizing field, tend to assume a position in which the main axis coincides substantially to the direction of the magnetizing field, i. e., the principal direction.

When the oriented particles are compressed, either during or after the application of the magnetic field and with or without the use of a binder, anisotropic permanent magnets are obtained which may be finally magnetized. As a result of the compression, the oriented particles have little freedom of movement and become substantially fixed. Even if the oriented particles are not compressed until after the removal of the magnetic field, a large part of the relative parallel orientation of the magnetic preferential directions of the particles will still be maintained. However, we prefer to compress the particles while applying the magnetizing field as this improves the relative parallel orientation.

When heating the oriented particles, for instance, to the sintering temperature, disorientation from the principal direction may be greatly reduced by applying the magnetizing field until the Curie temperature has been reached. When not using a magnetic field there is a possibility of disorientation, particularly at higher temperatures in the range up to the Curie point, due to the presence in the material of a demagnetizing field which results from the poles of the permanent magnet body. This difficulty may be avoided by decreasing this demagnetizing field by closing the magnetic circuit with ferromagnetic material. However, the possibility of disorientation is reduced to a greater extent by using a magnetizing field.

We have found quite unexpectedly that when using the methods of the invention, even when the oriented material is not compressed, the orientation is to a large extent maintained when the bodies are heated to the sintering temperatures which are above the Curie point and above the temperatures at which crystal growth is liable to occur. In fact, the orientation will even be improved in spite of the well known fact that it is not possible to control the relative position of the particles at such high temperatures by a magnetic field. While the above is true when the bodies are not compressed, we prefer to compress the particles into a body while applying the magnetic field as this improves the $(BH)_{max}$ value, even after the compressed particles have been sintered.

The orientation by a magnetic field may be effected at ordinary temperatures as well as at higher temperatures up to the vicinity of the Curie point. As a result, the use of temperatures that do not exceed about 300° C. to 400° C., whether such temperatures are used intentionally or unintentionally, are not necessarily detrimental.

In another embodiment of the method of the invention, the particles are placed in a mobile condition by distributing them in a liquid dispersing agent, which preferably contains a suitable binder. If it is not desired to compress the particles into a body prior to the sintering, the liquid may be removed, for example, by vaporization or suction and preferably while heating, in which case the binder holds the particles together and in proper orientation until the body is sintered. If the particles are to be compressed into a body, the liquid may be removed by compression with or without heating whereby a compacted body capable of being sintered may be obtained in a simple and inexpensive manner. In this case, the binder serves to further ensure that the particles will not become disorientated.

As a dispersing agent for holding the particles in a mobile condition, we prefer to use a liquid whose viscosity is so low as not to hamper the rotation of the preferential directions of the crystals into the direction of the magnetic field used during orientation at low temperatures. On the other hand, the liquid should be one in which, after the removal of a large part thereof, the residual binder will hold the particles together in a body which is sufficiently strong that the magnetic forces produced therein by the demagnetization field will not cause the body to break. A suitable dispensing agent is polyvinylacetate. Water may also be used as a dispersing agent but, in the absence of a sufficient quantity of a binder, this has the limitation that, after the removal of the greater part of the water, the particles are not held together sufficiently, to prevent disorientation or breakage.

In another embodiment of the method the particles are placed in a metal shroud or closed tube, for instance, of stainless steel, which is rolled at a temperature of 800° C. or more, preferably between 1000° C. and 1200° C., to produce the orientation. This rolling process, which alters the shape of the crystals, may be followed by a sintering process. The particles used may be either the final materials or the starting materials described in the above-mentioned patent application and an external magnetic field may be applied during the rolling operation.

The permanent magnets according to the invention are finally magnetized in the principal direction, for instance after they have been sintered while the magnet body is being cooled down from the sintering temperature, particularly in the range of temperatures below the Curie point. Compressed magnets which are not to be sintered may be finally magnetized by a magnetic field or by the magnetic field used to orient the crystals if this field is chosen sufficiently high so as to obtain magnetic saturation of the material.

In order that the invention may be clearly understood and readily carried into effect we shall describe the same in more detail with reference to a number of examples.

*Example 1*

A mixture of 450 grams of barium carbonate (68.6% by weight of Ba) and 2000 grams of $Fe_2O_3$ (68.4% by weight of Fe) was ground in a ball mill for 20 hours under alcohol. After drying the powder obtained was passed at a rate of 20 mms./min. through an electrical furnace having a heating zone 20 cms. long and maintained at a temperature of 1100° C. The firing period was consequently 10 minutes and firing was effected in air. After being cooled, the material was pulverized by grinding in a ball mill for 12 hours with alcohol. After being dried the prefired powder thus obtained was stirred with a 16% solution of polyvinylacetate in acetone to form a suspension containing 2 ccs. of the binder solution per gram of the powder. This suspension was placed in a brass die positioned between the poles of a magnetic yoke. The particles were subjected to a first field of 9500 Oersted while the acetone was removed by evaporation. The small block of anisotropic material thus formed was introduced into an electric furnace while postioned between poles of a magnetic yoke. While a second field of 2000 Oersteds was provided in the preferential direction of magnetization determined by the first field, the temperature was increased to 500° C. The field was removed and the material was sintered by passing the same at a rate of 20 mms./min. through an electric furnace having an atmosphere of air at a temperature of 1280° C. Since the heating zone was 10 cms. in length, the sintering period was 5 minutes. The sintered body so obtained had a remanence of 2650 Gauss, a field strength of disappearance $I^HC$ of 1775 Oersteds and a $B^HC$ of 1500 Oersteds in the principal direction. While the apparent density was only 3.9, a $(BH)_{max}$ value of $1.3 \times 10^6$ was obtained. At right angles to the principal direction, the remanence was 1260 Gauss.

*Example 2*

Pre-fired powder obtained in the manner described in Example 1 was stirred with a 8% solution of polyvinylacetate in acetone to form a suspension, use being made of 4 ccs. of the binder solution per 3 grams of the powder. The suspension was placed in a molding die positioned in a first magnetic field which was comparatively weak having a value of 2000 Oersteds. After the magnetic field was removed and the binder solution was removed, the powder was compressed into a block. The remaining binder solution was removed by firing the block in a second magnetic field of 2000 Oersteds in a manner similar to that described in Example 1. When a temperature of 500° C. had been reached, the magnetic field was removed and the block was sintered by passing the same at a rate of 20 mms./min. through the furnace which had an atmosphere of air at a temperature of 1300° C. The sintering operation required about 5 minutes. The block thus obtained has a remanence $Br$ of 2550 Gauss and a field strength of disappearance $I^HC$ of 1750 Oersteds. The $(BH)_{max}$ value in the principal direction was $1.13 \times 10^6$. A block obtained in the same manner but not subjected to an orientation by the first magnetic field treatment had a $(BH)_{max}$ value of $0.8 \times 10^6$. In both cases the "apparent density" was 5.0.

*Example 3*

In the manner described in Example 1, pre-fired powder was stirred with an 8% solution of polyvinylacetate in acetone to form a suspension, use being made of 2 cc. of the binder solution per gram of the powder. The suspension was introduced into a molding die and arranged in a comparatively weak first magnetic field of 2400 Oersteds. While the first field was applied the binder solution was removed. The blocks so obtained were further treated in the manner described in Example 2. The resulting blocks had a remanence $B_r$ in the principal direction of 2720 Gauss and a field strength of disappearance $I^HC$ of 1620 Oersteds. A $(BH)_{max}$ value $1.2 \times 10^6$ was obtained. At right angles to the preferential direction, the remanence was 1610 Gauss.

*Example 4*

Pre-fired powder obtained in the manner described in Example 1 was stirred with an 8% solution of polyvinyl-acetate in acetone to form a suspension, use being made of 1 cc. of binder solution per gram of powder. The solution was placed in a molding die positioned in a first magnetic field of 10,000 Oersted and while in this field, the binder solution was removed. The remaining binder solution was removed by heating to a temperature of 500° C. in a second magnetic field of 2000 Oersted. The blocks were then passed at a rate of 20 mms./min. through a furnace, as described in Example 1, having an atmosphere of air at 1280° C. In the principal direction the blocks had a remanence $B_r$ of 2875 Gauss, a field strength of disappearance $I^HC$ of 1800 Oersteds, a $B^HC$ value of 1550 Oersteds and a $(BH)_{max}$ value of $1.65 \times 10^6$. The remanence at right angles to the principal direction was 1625 Oersteds, and the field strength of disappearance $I^HC$ was 2100 Oersteds. A block obtained in the same manner but not subjected to a first magnetic field treatment had a remanence $B_r$ of 2150 Gauss, a field strength of disappearance $I^HC$ of 2000 Oersteds, a $B^HC$ value of 1450 Oersteds and a $(BH)_{max}$ value of $0.9 \times 10^6$.

*Example 5*

Pre-fired powder obtained in the manner described in Example 1 was stirred with water to form a suspension; 2 cc. of water being used per gram of powder. This suspension was placed in a molding die, subjected to a first magnetic field and molded to form blocks which were fired in the manner described in Example 4. In the principal direction these blocks had a remanence $B_r$ of 2870 Gauss, a field strength of disappearance $I^HC$ of 1610 Oersteds and a $(BH)_{max}$ value of $1.57 \times 10^6$. These blocks had a remanence $B_r$ at right angles to the principal direction of 1625 Gauss.

*Example 6*

Pre-fired powder obtained in the manner described in Example 1 was molded into blocks in the manner described in Example 4. These blocks were heated to 500° C. without the application of a magnetic field, and were then passed at the rate of 20 mms./min., through an electric furnace, having an atmosphere of air at a temperature of 1280° C. The firing period was about 5 minutes in the preferential direction. The blocks so obtained had a remanence $B_r$ of 3025 Gauss, a field strength of disappearance $I^HC$ of 1550 Oersteds and a $(BH)_{max}$ value of $1.58 \times 10^6$.

*Example 7*

A pre-fired mixture as described in Example 1, was pulverized by grinding for 48 hours in a ball mill under alcohol. After being dried the powder was formed into sintered blocks in the manner described in Example 4. In the principal direction these blocks had a remanence $B_r$ direction of 3100 Gauss, a field strength of disappearance $I^HC$ of 1650 Oersteds and a $(BH)_{max}$ value of $1.72 \times 10^6$. Blocks obtained in the same manner but not subjected to a first magnetic field treatment had a remanence $B_r$ of 2250 Gauss, a field strength of disappearance $I^HC$ of 1850 Oersteds and a $(BH)_{max}$ value of $0.95 \times 10^6$. The "apparent density" of the sintered blocks was 4.95.

*Example 8*

A mixture of 29.5 grams of strontium carbonate (as determined by analysis) and 179 grams of $Fe_2O_3$ (69.4% by weight of Fe) was ground for 15 hours in a ball mill with alcohol. After the alcohol was removed, the powder was dried and then heated for 2 hours at 1000° C. in an electric furnace having an atmosphere of air. After being cooled the material was ground for 4 hours in an agate centrifugal mill with alcohol. This prefired powder was formed into blocks in the manner described in Example 4. Blocks prepared in this manner had, in the principal direction, a remanence $B_r$ of 2640 Gauss, a field strength of disappearance $I^HC$ of 2825 Oersteds and a $(BH)_{max}$ value was $1.63 \times 10^6$. The "apparent density" was 4.34. At right angles to the principal direction the blocks had a remanence $B_r$ of 1550 Gauss. A block obtained in the same manner, but not subjected to a first field treatment, had a remanence $B_r$ of 2020 Gauss and, a field strength of disappearance $I^HC$ of 3225 Oersteds, a $(BH)_{max}$ value of $0.99 \times 10^6$ and an "apparent density" of 4.41.

*Example 9*

Starting with a mixture of 29.5 grams of strontium carbonate (as determined by analysis) and 163 grams of $Fe_2O_3$ (69.4% by weight of Fe), a pre-fired powder was formed into blocks in the manner described in Example 4. The blocks so obtained had, in the principal direction, a remanence $B_r$ of 2700 Gauss, a field strength of disappearance $I^HC$ of 2900 oersteds and a $(BH)_{max}$ value of $1.67 \times 10^6$. The remanence $B_r$ at right angles to the preferential direction was 1670 Gauss. The "apparent density" was 4.75. Blocks obtained in the same manner but not subjected to a first magnetic field treatment had a remanence $B_r$ of 2075 Gauss, a field strength of disappearance, $H_c$ of 3225 oersteds, and a $(BH)_{max}$ value of $0.88 \times 10^6$, and an "apparent density" of 4.69.

While we have described our invention in connection with specific examples and specific embodiments, other modifications thereof will be readily apparent to those skilled in the art without departing from the spirit and scope of this invention as defined in the appended claims.

What we claim is:

1. A method of making a permanent magnet magnetically-anisotropic in a principal direction comprising the steps of finely-dividing a mass of material consisting essentially of hexagonal crystals having the composition $MFe_{12}O_{19}$ in which M is at least one metal selected from the group consisting of barium, strontium and lead, orienting the crystals of said finely-divided material with preferential directions of magnetization parallel to the principal direction, compacting the so-oriented crystals into a body of desired shape, heating the so-compacted body at a temperature of about 900° C. to 1500° C. to sinter the same into a highly-coherent dense body, and finally magnetizing said body in said principal direction.

2. A method of making a permanent magnet magnetically-anisotropic in a principal direction comprising the steps of finely-dividing a mass of material consisting essentially of hexagonal crystals having the composition $MFe_{12}O_{19}$ in which M is at least one metal selected from the group consisting of barium, strontium and lead, magnetically orienting the crystals of said finely-divided material with prfeferential directions of magnetization parallel to the principal direction, compacting the so-oriented crystals into a body of desired shape, heating the so-compacted body at a temperature of about 900° C. to 1500° C. to sinter the same into a highly-coherent dense body, and finally magnetizing said body in said principal direction.

3. A method of making a permanent magnet magnetically-anisotropic in a principal direction comprising the steps of finely-dividing a mass of material consisting essentially of hexagonal crystals having the composition $MFe_{12}O_{19}$ in which M is at least one metal selected from the group consisting of barium, strontium and lead, suspending said finely-divided material in a liquid, magnetically orienting the crystals of said finely-divided material with preferential directions of magnetization parallel to the principal direction while the particles are suspended in said liquid, compacting the so-oriented crystals into a body of desired shape, heating the so-compacted body at a temperature of about 900° C. to 1500° C. to sinter the same into a highly-coherent dense body, and finely magnetizing said body in said principal direction.

4. A method of making a permanent magnet magnetically-anisotropic in a principal direction comprising the steps of finely-dividing a mass of material consisting essentially of hexagonal crystals having the composition $MFe_{12}O_{19}$ in which M is at least one metal selected from the group consisting of barium, strontium and lead, magnetically orienting the crystals of said finely-divided material with preferential directions of magnetization parallel to the principal direction while compacting the so-oriented crystals into a body of desired shape, heating the so-compacted body at a temperature of about 900° C. to 1500° C. to sinter the same into a highly-coherent dense body, and finally magnetizing said body in said principal direction.

5. A method of making a permanent magnet magnetically-anisotropic in a principal direction comprising the steps of finely-dividing a mass of material consisting essentially of hexagonal crystals having the composition $MFe_{12}O_{19}$ in which M is at least one metal selected from the group consisting of barium, strontium and lead, mechanically orienting the crystals of said finely-dividing material with preferential directions of magnetization parallel to the principal direction, compacting the so-oriented crystals into a body of desired shape, heating the so-compacted body at a temperature of about 900° C. to 1500° C. to sinter the same into a highly-coherent dense body, and finally magnetizing said body in said principal direction.

6. A method of making a permanent magnet magnetically-anisotropic in a principal direction comprising the steps of finely-dividing a mass of material consisting essentially of hexagonal crystals having the composition $MFe_{12}O_{19}$ in which M is at least one metal selected from the group consisting of barium, strontium and lead, rolling said mass at an elevated temperature to orient the crystals with preferential directions of magnetization parallel to the principal direction, compacting the so-oriented crystals into a body of desired shape, heating the so-compacted body at a temperature of about 900° C to 1500° C. to sinter the same into a highly-coherent dense body, and finally magnetizing said body in said principal direction.

7. A method of making a permanent magnet magnetically-anisotropic in a principal direction comprising the steps of finely-dividing a mass of material consisting essentially of hexagonal crystals having the composition of $BaFe_{12}O_{19}$, orienting the crystals of said finely-divided material with preferential directions of magnetization parallel to the principal direction, compacting the so-oriented crystals into a body of desired shape, heating the so-compacted body at a temperature of about 900° C. to 1500° C. to sinter the same into a highly-coherent dense body, and finally magnetizing said body in said principal direction.

8. A method of making a permanent magnet magnetically-anisotropic in a principal direction comprising the steps of finely-dividing a mass of material consisting essentially of hexagonal crystals having the composition of $SrFe_{12}O_{19}$, orienting the crystals of said finely-divided material with preferential directions of magnetization parallel to the principal direction, compacting the so-oriented crystals into a body of desired shape, heating the so-compacted body at a temperature of about 900° C. to 1500° C. to sinter the same into a highly-coherent dense body, and finally magnetizing said body in said principal direction.

9. A method of making a permanent magnet magnetically-anisotropic in a principal direction comprising the steps of finely-dividing a mass of material consisting essentially of hexagonal crystals having the composition of $PbFe_{12}O_{19}$, orienting the crystals of said finely-divided material with preferential directions of magnetization parallel to the principal direction, compacting the so-oriented crystals into a body of desired shape, heating the so-compacted body at a temperature of about 900° C. to 1500° C. to sinter the same into a highly-coherent dense body, and finally magnetizing said body in said principal direction.

10. A permanent magnet consisting of a highly-coherent sintered body magnetically-anisotropic in a principal direction and consisting essentially of a compact mass of hexagonal crystals of $MFe_{12}O_{19}$ in which M is at least one metal selected from the group consisting of Ba, Sr and Pb, said crystals being oriented with their preferential directions of magnetization parallel to said principal direction.

11. A permanent magnet consisting of a highly-coherent sintered body magnetically anisotropic in a principal direction and consisting essentially of a compact mass of hexagonal crystals of $MFe_{12}O_{19}$ in which M is at least one metal selected from the group consisting of Ba, Sr and Pb, an atomic fraction of not more than 0.4 of the quantity of one of said metals being replaced by Ca, said crystals being oriented with their preferential directions of magnetization parallel to said principal direction.

12. A permanent magnet consisting of a highly-coherent sintered body magnetically anisotropic in a principal direction and consisting essentially of a compact mass of hexagonal crystals of $BaFe_{12}O_{19}$, said crystals being oriented with their preferential directions of magnetization parallel to said principal direction.

13. An permanent magnet consisting of a highly-coherent sintered body magnetically anisotropic in a principal direction and consisting essentially of a compact mass of hexagonal crystals of $SrFe_{12}O_{19}$, said crystals being oriented with their preferential directions of magnetization parallel to said principal direction.

14. A permanent magnet consisting of a highly-coherent sintered body magnetically anisotropic in a principal direction and consisting essentially of a compact mass of hexagonal crystals of $PbFe_{12}O_{19}$, said crystals being oriented with their preferential directions of magnetization parallel to said principal direction.

15. A permanent magnet consisting of a highly-coherent sintered body magnetically-anisotropic in a principal direction and consisting essentially of a compact mass of hexagonal crystals of $MFe_{12}O_{19}$ in which M is at least one metal selected from the group consisting of Ba, Sr, and Pb, said crystals being oriented with their preferential directions of magnetization parallel to said principal direction, said magnet having in said direction a $(BH)_{max}$ of at least $1.1 \times 10^6$ and at least 140% of that of an isotropic magnet of the same composition.

References Cited in the file of this patent

UNITED STATES PATENTS

| | | |
|---|---|---|
| 1,991,143 | Ehlers | Feb. 12, 1935 |
| 1,997,193 | Kato et al. | Apr. 9, 1935 |
| 2,188,091 | Baermann | Jan. 23, 1940 |
| 2,463,413 | Neel | Mar. 1, 1949 |
| 2,576,679 | Guillaud | Nov. 27, 1951 |